(12) United States Patent
Shveidel et al.

(10) Patent No.: US 10,747,677 B2
(45) Date of Patent: Aug. 18, 2020

(54) SNAPSHOT LOCKING MECHANISM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

(21) Appl. No.: 16/047,815

(22) Filed: Jul. 27, 2018

(65) Prior Publication Data
US 2020/0034308 A1 Jan. 30, 2020

(51) Int. Cl.
*G06F 12/10* (2016.01)
*G06F 3/06* (2006.01)

(52) U.S. Cl.
CPC ............ *G06F 12/10* (2013.01); *G06F 3/0619* (2013.01); *G06F 3/0634* (2013.01); *G06F 3/0673* (2013.01); *G06F 2212/1041* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,606,870 B1 | 3/2017 | Meiri et al. | |
| 9,716,754 B2 | 7/2017 | Swift | |
| 10,198,321 B1* | 2/2019 | Gordon | G06F 11/1448 |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Charles Rones
*Assistant Examiner* — Jonah C Krieger
(74) *Attorney, Agent, or Firm* — Ryan, Mason & Lewis, LLP

(57) ABSTRACT

A storage system comprises a plurality of storage devices and an associated storage controller. The plurality of storage devices are configured to store a plurality of logical units (LUNs) and snapshot data structures associated with the plurality of LUNs. The storage controller is configured to determine a mapping of a logical address associated with a pending read or write operation to a snapshot address associated with a given snapshot data structure of the storage system that comprises a plurality of nodes generated during point-in-time snapshots taken based on at least one of the LUNs, lock at least a portion of the given snapshot data structure during the read or write operation based on the determined mapping, and release the lock on the at least a portion of the given snapshot data structure in response to a completion of the read or write operation.

20 Claims, 7 Drawing Sheets

(56) References Cited

U.S. PATENT DOCUMENTS

| | | | |
|---|---|---|---|
| 2004/0083345 A1* | 4/2004 | Kim | G06F 11/1466 711/162 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0068127 A1* | 3/2014 | Baron | G06F 9/526 710/200 |
| 2014/0181016 A1 | 6/2014 | Whitehead et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

\* cited by examiner

FIG. 2

200 — USER DATA PAGES

| LUN ID | OFFSET | SIGNATURE 1 | USER DATA PAGE 1 |
| LUN ID | OFFSET | SIGNATURE 2 | USER DATA PAGE 2 |
| ... | ... | ... | ... |
| LUN ID | OFFSET | SIGNATURE n | USER DATA PAGE n |

FIG. 3

300 — METADATA PAGES

| SIGNATURE 1 | METADATA PAGE 1 CHARACTERIZING SET OF $n$ USER DATA PAGES |
| SIGNATURE 2 | METADATA PAGE 2 CHARACTERIZING SET OF $n$ USER DATA PAGES |
| ... | ... |
| SIGNATURE m | METADATA PAGE m CHARACTERIZING SET OF $n$ USER DATA PAGES |

SNAPSHOT LOCKING MECHANISM

FIELD

The field relates generally to information processing systems, and more particularly to storage in information processing systems.

BACKGROUND

In some information processing systems, consistency between input/output (IO) accesses is provided through a locking mechanism that locks a logical address or physical address that is targeted by those IO accesses. For example, in some systems, an address lock may be implemented which may be taken by an IO thread to lock a logical address. The lock may be taken in either an exclusive mode for write operations or a non-exclusive mode for read operations. The lock is maintained until the read or write operation has completed at which point the lock may be released by the IO thread.

SUMMARY

In one embodiment, a storage system comprises a plurality of storage devices and an associated storage controller. The plurality of storage devices are configured to store a plurality of logical units (LUNs) and snapshot data structures associated with the plurality of LUNs. The storage controller is configured to determine a mapping of a logical address associated with a pending read or write operation to a snapshot address associated with a given snapshot data structure of the storage system. The given snapshot data structure comprises a plurality of nodes generated during point-in-time snapshots taken based on at least one of the logical units (LUNs). The storage controller is further configured to lock at least a portion of the given snapshot data structure during the read or write operation based on the determined mapping of the logical address to the snapshot address. The storage controller is further configured to release the lock on the at least a portion of the given snapshot data structure in response to a completion of the read or write operation. The storage controller may be implemented using at least one processing device comprising a processor coupled to a memory.

In some embodiments, the snapshot address may comprise a snapshot data structure identifier corresponding to the given snapshot data structure and an offset. The offset may be associated with each node of the given snapshot data structure and the lock may be performed on each node of the given snapshot data structure at the offset.

In some embodiments, the storage controller may be further configured to lock the logical address during the read or write operation and release the lock on the logical address in response to a completion of the read or write operation.

These and other illustrative embodiments include, without limitation, apparatus, systems, methods and processor-readable storage media.

BRIEF DESCRIPTION OF THE DRAWINGS

FIG. 2 shows an example of a set of user data pages in an illustrative embodiment.

FIG. 3 shows an example of a set of metadata pages in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
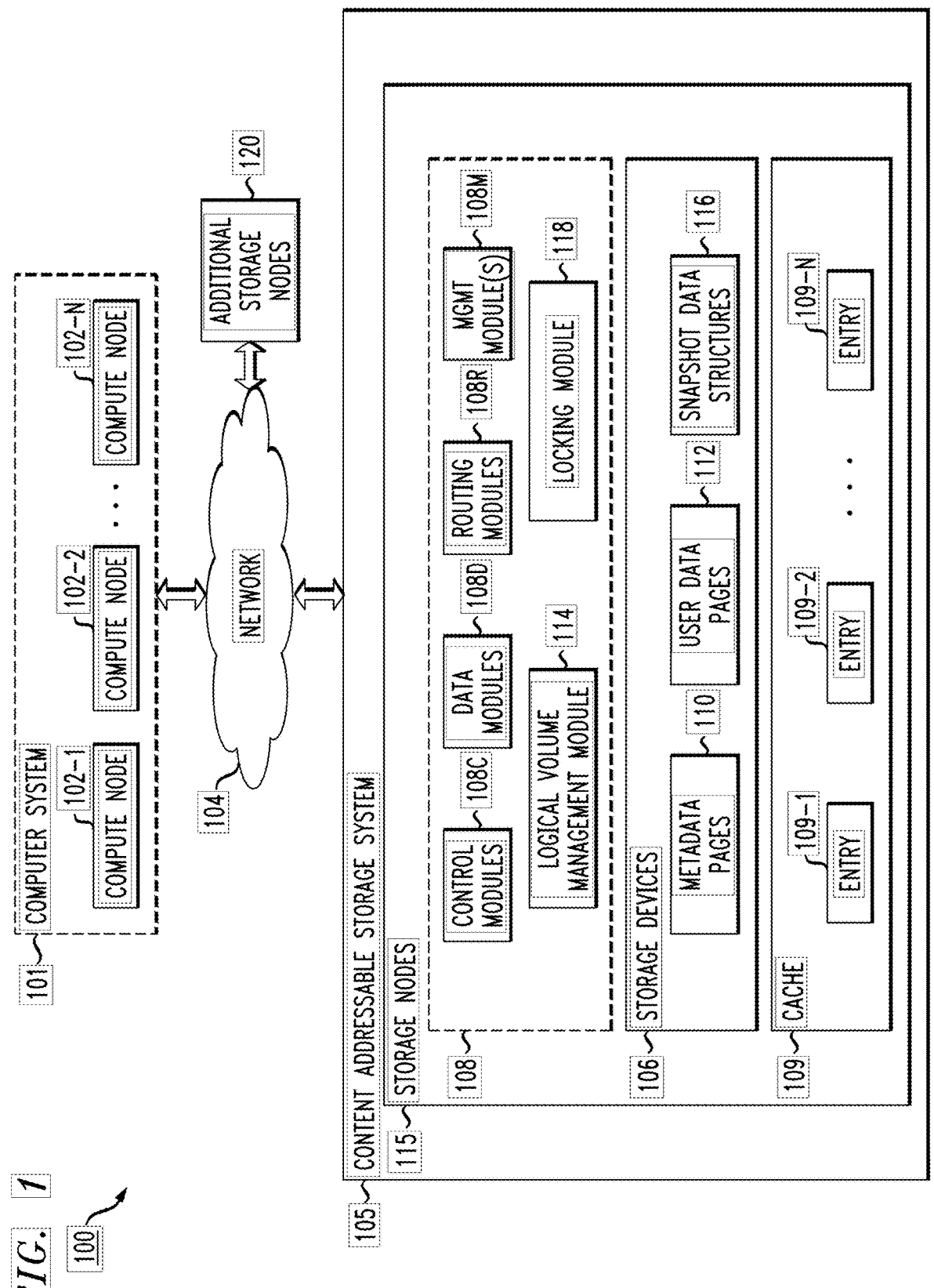
FIG. 1 is a block diagram of an information processing system comprising a content addressable storage system in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106, an associated storage controller 108, and an associated cache 109. The storage devices 106 are configured to store metadata pages 110 and user data pages 112 and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item" or volume, on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used. In some aspects, the hash metadata may also be loaded into cache 109.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

As noted above, the storage devices 106 are configured to store user data pages 200 and metadata pages 300 in respective user data page and metadata page areas. Each of the user data pages 200 comprises a logical address and a content-based signature derived from content of that data page, and each of the metadata pages 300 characterizes a plurality of the user data pages 200 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

Ownership of a user data logical address space within the content addressable storage system 105 is illustratively distributed among the control modules 108C.

The cache 109 of storage system 105 in the FIG. 1 embodiment includes write cache entries 109-1, 109-2, . . . , 109-N which store incoming IO request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108. In some aspects, the caches 109 of each storage node 115 may operate together as a single cache 109 of the content addressable storage system 105 where the components of a given storage node 115 may access any portion of the cache 109 including those portions included as components of other storage nodes 115.

It is desirable in these and other storage system contexts to implement functionality for locking snapshot data structures across multiple distributed processing modules, such as the processing modules 108C, 108D, 108R and 108M of the distributed storage controller 108.

The management module 108M of the storage controller 108 may include a locking module 118 that engages corresponding control logic instances in all of the control modules 108C and routing modules 108R in order to implement processes for locking snapshot data structures within the system 100, as will be described in more detail below in conjunction with FIGS. 6-8 in illustrative embodiments. In some embodiments, locking module 118 may be included as part of control modules 108C or as part of any other modules of storage controller 108.

In some embodiments, the content addressable storage system 105 comprises an XtremIO™ storage array suitably modified to incorporate techniques for locking snapshot data structures as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise locking module 118, although other types and arrangements of system-wide management modules can be used in other embodiments. Accordingly, functionality for locking snapshot data structures in some embodiments is implemented under the control of locking module 118 of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system and directed from one processing module to another processing module of the distributed storage controller. For example, a received write request may be directed from a routing module of the distributed storage controller to a particular control module of the distributed storage controller. The write request may be stored in the write cache portion of cache 109, acknowledged to a compute node of the computer system 101, and subsequently destaged at a later time to a persistent data storage location on one or more of storage devices 106. Other arrangements for receiving and processing write requests from one or more host devices can be used.

Communications between control modules 108C and routing modules 108R of the distributed storage controller 108 may be performed in a variety of ways. An example embodiment is implemented in the XtremIO™ context, and the C-modules, D-modules and R-modules of the storage nodes 115 in this context are assumed to be configured to communicate with one another over a high-speed internal network such as an InfiniBand network. The C-modules, D-modules and R-modules coordinate with one another to accomplish various IO processing tasks.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

The manner in which functionality for locking snapshot data structures is provided in the FIG. 1 embodiment will now be described. The process is assumed to be carried out by the processing modules 108C, 108D, 108R and 108M. It is further assumed that the control modules 108C temporarily store data pages in the cache 109 of the content addressable storage system 105 and later destage the temporarily stored data pages via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses (LXAs) each comprising an External LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash-to-physical ("H2P") table, sometimes known as a hash metadata ("HMD") table, with the A2H and H2P tables corresponding to respective logical and physical layers of the content-based signature mapping within the storage system 105.

The first level of mapping using the A2H table associates LXAs of respective data pages with respective content-based signatures of those data pages. This is also referred to as logical layer mapping.

In some embodiments, the A2H table alternatively associates Internal Logical Addresses (ILXAs) of respective data pages with the respective content-based signatures of those data pages where the LXAs are separately mapped to the ILXAs in a mapping table. An ILXA may, for example, comprise an Internal LUN ID and an offset, similar to the External LUN ID and offset of the LXA. The Internal LUN ID corresponds to a particular LUN of the storage system 105 and may be associated with a snapshot data structure 116. For example, each node of the snapshot data structure 116 may be a LUN of the storage system 105 and may have a corresponding Internal LUN ID that may be used to identify the LUN. The Internal LUN ID for each node may be included in an ILXA that may be used for mapping to LXAs, hash handles (HHs), or any other mapping.

The LXA to ILXA mapping may be updated, for example, when a point in time snapshot is added, modified, deleted, or other similar operation is performed on a LUN associated with of the snapshot data structure 116. For example, the LXA may be remapped from an ILXA associated with a particular node, e.g., LUN, of the snapshot data structure 116 to a new ILXA associated with a new production entity node P, e.g., a new LUN generated during the snapshot process and having a new Internal LUN ID. Snapshot data structures 116 are described in more detail below.

The second level of mapping using the H2P table associates respective ones of the content-based signatures with respective physical storage locations in one or more of the storage devices 106. This is also referred to as physical layer mapping.

For a given write request, both of the corresponding A2H and H2P tables are updated in conjunction with the processing of that write request. For example, the A2H table may be updated when the page data for the write request is stored in cache 109 and the H2P table may be updated when the page data is later hardened to storage devices 106 during a destaging process.

The A2H and H2P tables described above are examples of what are more generally referred to herein as "mapping tables" of respective first and second distinct types. Other types and arrangements of mapping tables or other content-based signature mapping information may be used in other embodiments.

As indicated above, the storage controller 108, illustratively comprising the modules 108C, 108R and 108M as illustrated in FIG. 1 as well as additional modules such as data modules 108D, is configured to implement functionality for locking snapshot data structures in the content addressable storage system 105.

Storage controller 108 may include a Logical Volume Management (LVM) module 114 that is responsible for management of volumes in the storage system 105 including executing operations such as, for example, volume creation, volume deletion, and volume mapping. In some embodiments, LVM module 114 may be included as part of MGMT module 108M. LVM module 114 is also configured to maintain snapshot data structures 116, e.g., snapshot trees or other relational structures that identify relationships between a set of LUNs, for each volume or group of volumes in the storage system 105. A snapshot data structure 116 includes snapshots, e.g., LUNs, that are created by capturing the state of data in one or more LUNs at a particular point in time. In some embodiments, a snapshot data structure 116 associated with a LUN that has not yet received a point in time snapshot may comprise only that LUN as a root node. In some embodiments, a snapshot may be both readable and writeable. In some embodiments, a snapshot may only be readable. In some embodiments, the snapshot may be configured at the time of the snapshot or at a later time to be either readable only or readable and writable.

In some embodiments, LVM module 114 may, for example, execute or implement snapshot creation, snapshot mapping, snapshot merging, and other similar operations related to the addition, modification, or deletion of nodes in snapshot related data structures. In some embodiments, snapshot data structures 116 may be stored, for example, in storage devices 106. In some embodiments, snapshot data structures 116 may also or alternatively be stored, for example, in cache 109, other portions of storage node 115, in other storage nodes 115, in additional storage nodes 120, or in other similar locations.

Figure 4:
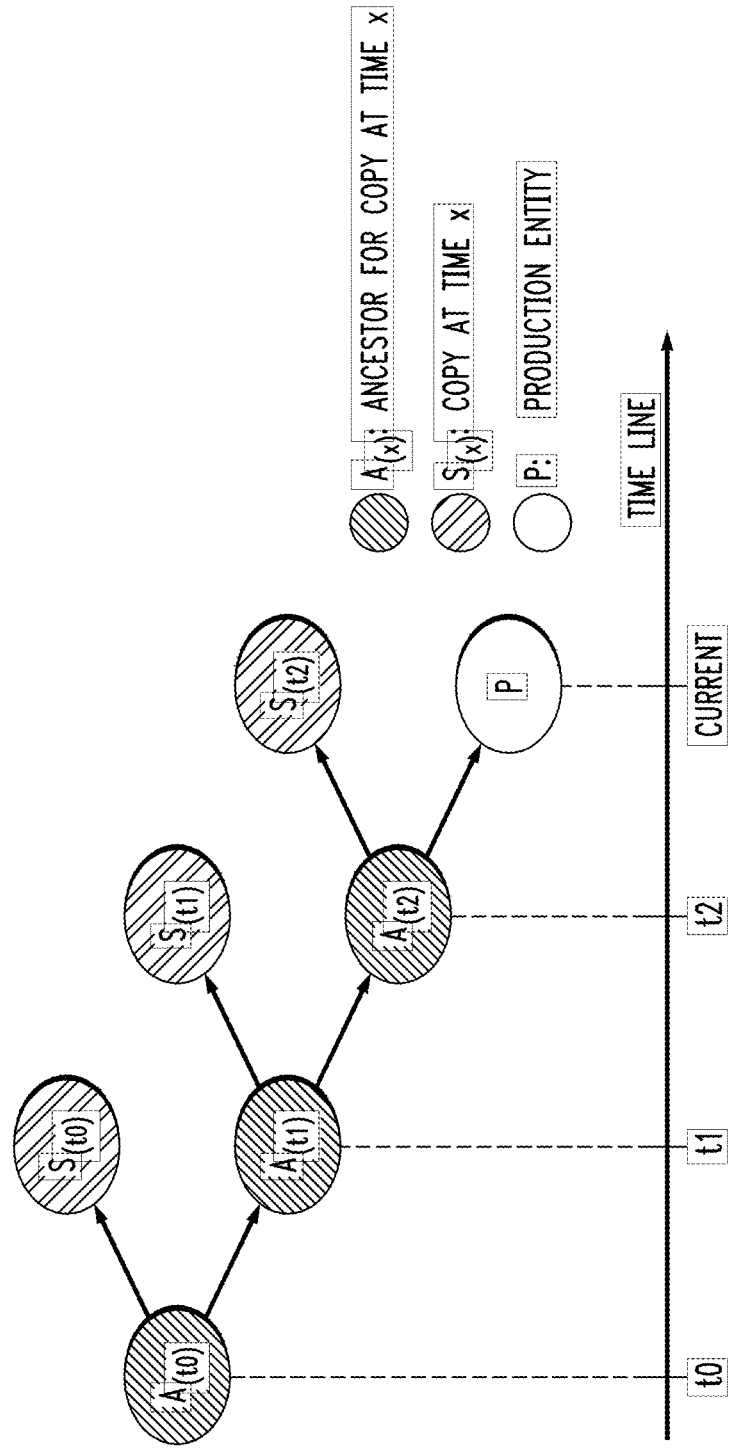
FIGS. 4 and 5 show an example of a snapshot data structure in an illustrative embodiment.
Figure 5:
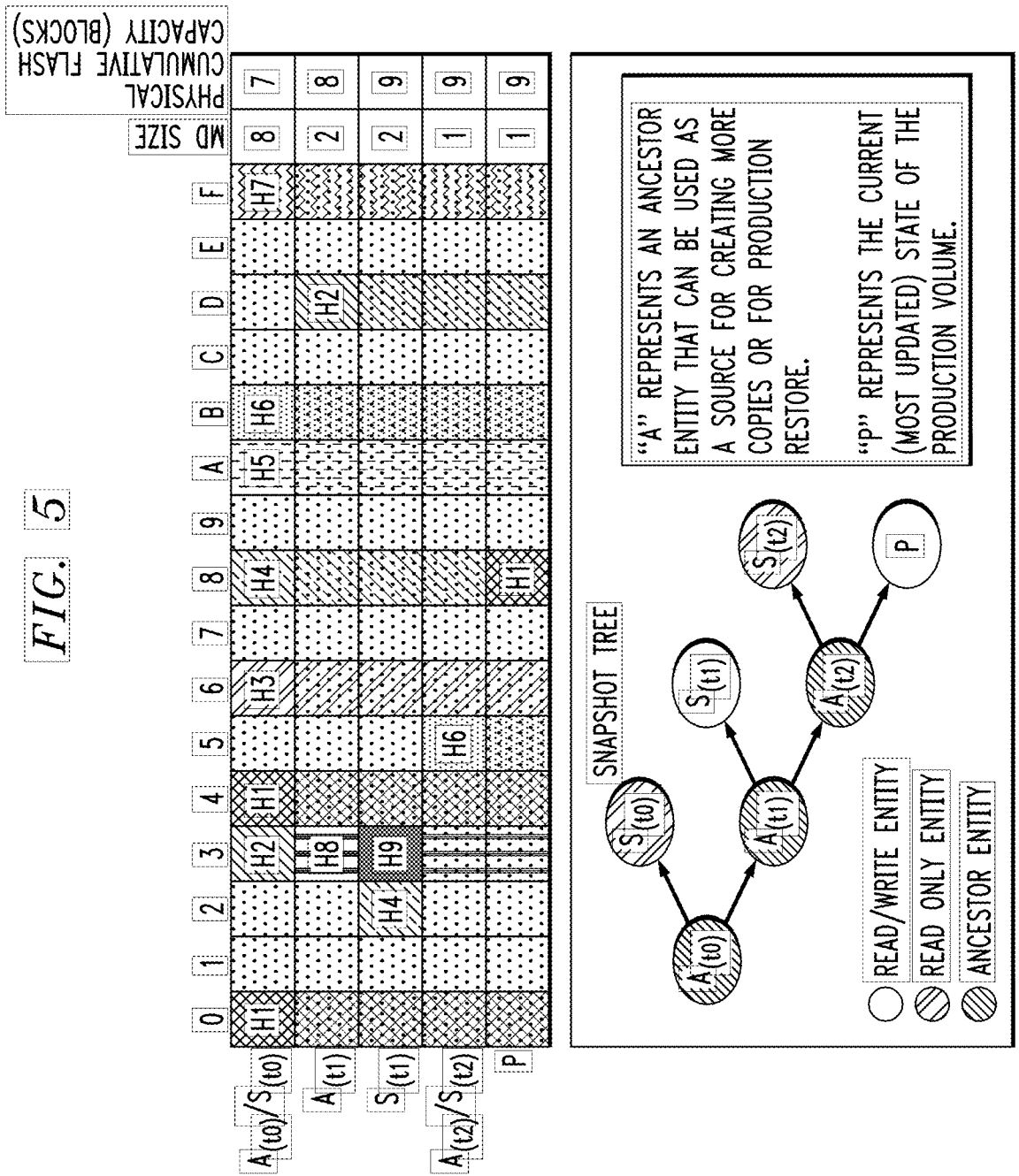

With reference to FIGS. 4 and 5, diagrams illustrating the structure and functionality of an example snapshot data structure 116, e.g., a snapshot tree or other relational data structure, will now be described. As illustrated in FIGS. 4 and 5, an example snapshot data structure 400 has an associated timeline, e.g., $t_0, t_1, t_2, \ldots$, current or Production (P), that depicts the times at which snapshots or other actions are taken. With reference to FIG. 4, for example, $A_{(x)}$ denotes an ancestor node of the snapshot data structure 116 at a time X, $S_{(x)}$ denotes a snapshot node of the snapshot data structure 116 at the time X, and P denotes a production entity node of the snapshot data structure 116, e.g., the node of the snapshot data structure 116 that is actively processing IO requests. While described herein as ancestor nodes, snapshot nodes, and production entity nodes of the snapshot data structure 116, in some embodiments, the nodes are assumed to be LUNs of the storage system 105 where the relationships between the LUNs are maintained by the snapshot data structure 116, e.g., by representation as nodes.

As can be seen from the example of FIG. 4, a snapshot is taken of the volume at time $t_0$. During the snapshot process, the production entity is set as an ancestor node $A_{(t0)}$ and two descendant nodes are generated based on that ancestor node $A_{(t0)}$, e.g., as leaves of that ancestor node $A_{(t0)}$. The first node is the snapshot node, $S_{(t0)}$, that points to the metadata of the ancestor node $A_{(t0)}$. In some embodiments, snapshot node $S_{(t0)}$ may alternatively be a full copy of the data associated with ancestor node $A_{(t0)}$. The second node is a production entity node which also points to the metadata of the ancestor node $A_{(t0)}$ but continues processing new IO requests and making changes to the volume relative to the state found in ancestor node $A_{(t0)}$. As each new snapshot is taken, the process continues, as seen, for example, in FIG. 4. For example, at time $t_1$, another snapshot is taken that creates an ancestor node $A_{(t1)}$. A snapshot $S_{(t1)}$ and production entity node are created that point to the metadata of the ancestor node $A_{(t1)}$ and IO processing continues with the new production entity node. This process continues for each snapshot of the volume as illustrated for example where a set of ancestor nodes $A_{(t0)}, A_{(t1)}, A_{(t2)}, \ldots, A_{(tm)}$, eventually lead to a production entity node P with each ancestor node having a corresponding snapshot $S_{(t0)}, S_{(t1)}, S_{(t2)}, \ldots, S_{(tm)}$. As illustrated in FIG. 4, for example, the snapshot data structure 116 may resemble a tree of snapshot and ancestor nodes with the production entity node P at an edge. In some embodiments, snapshots may be taken of snapshot nodes. For example, a snapshot may be taken of a snapshot node for use in testing new features, debugging, backup, or for other purposes.

In some embodiments, the metadata of the snapshot data structure 116 may be shared between the nodes of the snapshot data structure 116. For example, where metadata associated with a LUN or offset into the LUN has not been changed from the LUN of a prior ancestor node $A_{(x)}$, the child node may rely on the metadata stored by the prior ancestor node $A_{(x)}$. For example, the prior ancestor node $A_{(x)}$ may include a set of metadata corresponding to the data stored in a LUN. If the data at a particular offset into the LUN has not changed from the prior ancestor $A_{(x)}$, a subsequent node may simply reference that metadata for use by users. If the data at the offset has changed since the prior ancestor $A_{(x)}$, the subsequent node may maintain unique metadata for the offset into the LUN that has changed.

With reference to FIG. 5, example changes to a snapshot data structure 116 at times $t_0$, $t_1$, $t_2$, and P will now be described. At time $t_0$, a snapshot is taken of the volume. The snapshot process generates an ancestor node $A_{(t0)}$, a snapshot node $S_{(t0)}$, and a production entity node. In this case the snapshot node $S_{(t0)}$ is a read only snapshot node. At the time of the snapshot, the ancestor node $A_{(t0)}$, snapshot node $S_{(t0)}$, and the production entity node have the same metadata including metadata H1 stored at offset 0, metadata H2 stored at offset 3, metadata H1 stored at offset 4, metadata H3 stored at offset 6, metadata H4 stored at offset 8, metadata H5 stored at offset A, metadata H6 stored at offset B, and metadata H7 stored at offset F. In some embodiments, for example, the snapshot node $S_{(t0)}$ and the production entity node may point to the metadata of ancestor node $A_{(t0)}$. The production entity node continues with IO processing, tracking changes to the metadata until a new snapshot is taken at time $t_1$.

At time $t_1$, a read/write snapshot is taken of the production entity node which generates an ancestor node $A_{(t1)}$, a snapshot node $S_{(t1)}$, and a production entity node. At the time of the snapshot, the ancestor node $A_{(t1)}$, snapshot node $S_{(t1)}$, and the production entity node have the same metadata. For any metadata that has not changed since time $t_0$, the prior metadata found in ancestor node $A_{(t0)}$ may be referenced. The state at time $t_1$ is captured in ancestor node $A_{(t1)}$, with new metadata H8 overwriting metadata H2 at offset 3, and metadata H2 being added at offset D. Since snapshot node $S_{(t1)}$ is a read/write node, snapshot node $S_{(t1)}$ is further modified from the state of ancestor node $A_{(t1)}$ to include metadata H4 at offset 2. As illustrated, the state of snapshot node $S_{(t1)}$ corresponds to the state of ancestor node $A_{(t1)}$ at the current or production time P.

The production entity node continues with IO processing relative to the state of ancestor node $A_{(t1)}$ tracking changes to the metadata until a new snapshot is taken at time $t_2$.

At time $t_2$, a read only snapshot is taken of the production entity node which generates an ancestor node $A_{(t2)}$, a snapshot node $S_{(t2)}$, and a production entity node P (now the active node in this example). At the time of the snapshot, the ancestor node $A_{(t2)}$, snapshot node $S_{(t2)}$, and the production entity node have the same metadata. For any metadata that has not changed relative to the state of ancestor node $A_{(t1)}$ at time $t_1$, the prior metadata found in ancestor node $A_{(t1)}$ may be referenced. The state at time $t_2$ is captured in ancestor node $A_{(t2)}$, with new metadata H6 being added at offset 5. Since snapshot node $S_{(t2)}$ is a read only node, snapshot node $S_{(t2)}$ has the same metadata as ancestor node $A_{(t2)}$ and may simply reference the metadata of ancestor node $A_{(t2)}$.

The production entity node P continues with IO processing relative to the state of ancestor node $A_{(r2)}$ tracking changes to the metadata until a new snapshot is taken. For example, since time t2, metadata H1 has replaced metadata H4 at offset 8. Thus, the production entity node P stores metadata H1 in offset 8, includes a reference to ancestor node $A_{(r2)}$ for metadata H6 in offset 5, a reference to ancestor node $A_{(r1)}$ for metadata H8 in offset 3 and H2 in offset D, and a reference to ancestor node $A_{(r0)}$ for metadata H1 in offset 0, H1 in offset 4, H3 in offset 6, H5 in offset A, H6 in offset B, and H7 in offset F. In some embodiments, production entity node P may reference ancestor nodes $A_{(r0)}$ and $A_{(r1)}$ indirectly through ancestor node $A_{(r2)}$. The above description of a snapshot using the example snapshot data structure 116 is not limiting and any other method of copying metadata or data in a system for the purpose of creating a point in time snapshot that may be later used or recovered may alternatively be used.

In some embodiments, each node in the snapshot data structure 116 may correspond to a different Internal LUN ID, and thus a different ILXA. For example, each node in the snapshot data structure 116 may be a LUN having a particular LUN ID where the snapshot data structure 116 defines the relationships between these LUNs in the storage system 105.

LVM module 114 is also responsible for mapping LXAs to ILXAs, and vice versa. As mentioned above, an LXA contains a Volume ID, also known as an External LUN ID, that identifies a target LUN to be read from or written to, and an offset into that LUN that identifies the given address in that LUN where the data page should be read from or written to. An ILXA contains an Internal LUN ID corresponding to a particular node, e.g., LUN, of the snapshot data structure 116 and an offset inside that node. For example, each node of the snapshot data structure 116 may be accessed as a different LUN in the storage system 105 and may have a different corresponding Internal LUN ID even though a given node may have been generated during a snapshot based on another node, e.g., an ancestor node, at a particular point in time. In some embodiments, for example, one or more Internal LUN IDs corresponding to nodes, e.g., LUNs, of the snapshot data structure 116 may be separately mapped to different External LUN IDs that are visible to the computer system 101 or host device. In some embodiments, this mapping may be stored, for example, by storage controller 108 in an LXA <->ILXA mapping table. In some embodiments, the LXA may additionally or alternatively be parsed into the External LUN ID and offset, the mapping between the External LUN ID and an Internal LUN ID may be determined and stored in an External LUN ID <->Internal LUN ID mapping table, and the ILXA may be generated based on the mapped Internal LUN ID and the offset.

An IO request identifies particular data pages to be written to or read from in the storage system 105 by their corresponding LXAs. During servicing of the IO request, an IO thread may determine the mapping of the LXA to an ILXA. As noted above, operations executed by LVM module 114 may add or change this mapping, for example, by creating, merging, modifying, deleting, or taking any other action on a snapshot. For example, when a new snapshot is created, LVM module 114 may remap the LXA from the ILXA associated with a newly created ancestor node corresponding to the state of the volume at the point in time of the snapshot, to an ILXA corresponding to one of its newly created child nodes, e.g., the ILXA of the production entity node P that will actively process new IO requests.

Distributed content-addressing storage systems such as, e.g., storage system 105, often process multiple concurrent IO requests to different LUNs and addresses. Consistency between the IO accesses to the same logical address in the same LUN in such a system is often protected by an address level locking mechanism on the relevant logical address, e.g., the LXA identified by the IO request. The IO processing thread typically takes an address level lock on the relevant LXA, which also locks the mapped counterpart ILXA, either in exclusive mode, e.g., for write operations, or in non-exclusive mode, e.g., for read operations. In some embodiments, for example, the mapping of an LXA to an ILXA is a one-to-one mapping. The IO processing thread typically holds the address level lock until all the involved metadata and data associated with the IO request is updated and persisted, i.e., during a write operation, or read, i.e., during a read operation. In some cases, since the range of logical addresses is practically unlimited in storage systems with thin provisioning, it may be impossible to maintain a lock object for each possible LXA. A hash-based pool of locks is often applied instead. For example, when an address lock for some LXA is required, a lock object is typically allocated from the pool of locks and added to a pool hash table with LXA as the key. This effectively locks the logical address of the LXA.

The use of write cache complicates the locking process. Write cache reduces latency of servicing received write IO requests by dividing the write IO flow into two phases.

In the first phase, which is synchronous with receipt of the IO request, the IO thread persists the data associated with the write IO request in write cache and a corresponding journal and acknowledges the host device or compute node that submitted the write IO request. In some embodiments, for example, the data may be written in a write cache journal entry and referenced by a unique Write Cache Handle (WC). A new temporary entry may be added to the A2H mapping table for storage controller 108 by the IO thread which associates the target ILXA with the corresponding WC, e.g., an ILXA to WC mapping.

In the second phase, which is a background process that is asynchronous with receipt of the IO request, a background destager thread destages the write cache to the persistent storage location, such as, e.g., storage devices 106 described above. For example, the destager thread may aggregate write cache entries and process them in H2P/RAID, obtain content-based signatures, e.g., hash handles (HH), corresponding to processed write cache entries from the H2P mapping, and may update the A2H mapping of the storage controller 108 by replacing the temporary WC references with the final content-based signature, e.g., HH, i.e. replace the temporary ILXA->WC mapping with a final ILXA->HH in the A2H mapping of the storage controller 108.

Since the background destage process is also a write operation, locking of the logical address during destaging may also be relevant. For example, the write cache destage process should also be protected by the exclusive address lock used for write operations.

In some cases, the LVM module 114 may change the mapping between the LXA (i.e., the logical address including the LUN that is the client side target of the IO request) and the ILXA (i.e., the logical address including the LUN that write cache destage process will operate on) in the time between the execution of the first and second phases of the write cache process, e.g., after completion of the synchronous phase but before the asynchronous destage process is executed. For example, the LVM module 114 may execute a snapshot of a group of LUNs that include the given LUN, or may execute a snapshot of only the given LUN itself, which updates the snapshot data structure 116 associated with the given LUN by adding one or more new LUNs, e.g., as child nodes based on the given LUN. This operation may change the mapping of the LXA from the ILXA associated with the ancestor node, e.g., the given LUN, created by the snapshot process, which represents the state of the given LUN at the point in time that the snapshot was taken, to a new ILXA associated with the new production entity node, e.g., a new LUN, created by the snapshot process which is a copy of the given LUN that may be further modified by the storage system 105. In such an event, the write cache destage process, which operates based on the original mapping of the LXA to the ILXA associated with the given LUN may compete with another IO thread that accesses the same data from a different LXA which now is mapped to the new ILXA associated with the new production entity node, e.g., the new LUN. For example, since both the ILXA associated with the ancestor node, e.g., given LUN, and the ILXA associated with the new production entity, e.g., new LUN, effectively map to the same physical address, the destager thread and the other IO thread may compete for access to that physical address via their respective ILXAs.

The use of write cache may reduce the effectiveness of the regular address lock for providing data consistency between IO accesses. Typically, this consistency is only guaranteed if there are no inflight (non-destaged) write cache entries at the time of any LVM operation. One way to guarantee this consistency is for the storage system to require a forced destage of all active write cache entries before starting any LVM operation that updates snapshot data structure 116 and ILXA mappings such as, e.g., creating snapshot. However, such a requirement may make the use of write cache both inefficient and limited in its usefulness since a write cache that must be constantly cleared to perform LVM operations typically will not function in an optimal or even effective manner. In addition, such a requirement will also increase the latency of LVM operations as they must wait for the write cache to be cleared before executing.

In some illustrative embodiments, a snapshot data structure level lock is disclosed that allows the storage controller 108 to lock the corresponding ILXAs of an entire snapshot data structure 116 or multiple snapshot data structures 116 during write and read operations. A new snapshot address (SLXA) is disclosed. SLXA is defined as a combination of a snapshot data structure ID and an offset. The snapshot data structure ID is similar to LXA and ILXA, just with the LUN ID part of LXA replaced by snapshot data structure ID. For example, the snapshot data structure ID identifies the target snapshot data structure 116 or group of snapshot data structures 116. In some embodiments, the offset of the SLXA is an offset for each of the nodes in the snapshot data structure 116 or group of snapshot data structures 116. In some embodiments, the offset of the LXA, ILXA, and SLXA may be the same.

In some embodiments, a mapping to the SLXA may be as follows. Any LXA/ILXA may be uniquely mapped to SLXA, for example, since any LUN ID (internal or external) has a unique mapping that is associated with a snapshot data structure or group of snapshot data structures. The reverse mapping is not unique. For example, an SLXA may correspond to several LXA/ILXAs, e.g., depending on the number of snapshots in the given snapshot data structure 116 or group of snapshot data structures 116. Thus, the LXA/ILXA->SLXA mapping represents a many to one mapping while the SLXA->LXA/ILXA represents a one to many mapping.

A new snapshot lock is also defined as a lock for specific SLXA. The snapshot lock may be an offset throughout a snapshot data structure 116 or group of snapshot data structures 116. For example, when a snapshot lock is used, the entire snapshot data structure 116 or group of snapshot data structures 116 is locked at the offset included in the SLXA, i.e., each node, e.g., LUN, of each snapshot data structure 116 identified by the snapshot ID of the SLXA is locked at the offset of the SLXA.

In some embodiments, the implementation of snapshot lock may be similar to the address lock with the exception that the SLXA is used as a hash table Key instead of LXA in the hash-based pool of locks.

In illustrative embodiments, during use, any location where address lock was previously used may be replaced with the snapshot lock. For example, the target LXA/ILXA may be mapped to the SLXA associated with the corresponding snapshot data structure 116 or snapshot data structures 116 that were targeted by the LXA/ILXA, i.e., the unique mapping, as noted above, and the snapshot lock may be taken for this SLXA. In a similar manner to that described for address lock above, IO threads may take a snapshot lock either in exclusive mode, e.g., for write commands, or in non-exclusive mode, e.g., for "read" commands. The write cache destager may take the snapshot lock in exclusive mode since the write cache destaging is a "write" operation.

Since the mapping from LXA/ILXA to SLXA is constant, i.e., the mapping of an LXA or ILXA to the SLXA will not change, and it is not affected by any LVM operations, the snapshot lock guarantees data consistency regardless of any LVM operations. For example, a change in the mapping of the LXA to the ILXA does not affect the SLXA because all of the ILXAs in a snapshot data structure 116 or group of snapshot data structures 116 that are affected by an LVM operation will still map to the same SLXA.

In some embodiments, the SLXA snapshot lock may be further modified to reduce contention on the snapshot lock, e.g., the waiting time of competing threads to access the lock. For example, an IO thread may take two kinds of locks, an address lock and a snapshot lock. The address lock may be a lock for the target LXA in either exclusive or non-exclusive mode, e.g., depending on whether the operation is a write operation or a read operation. The snapshot lock may also be taken on the mapped SLXA by the IO thread in non-exclusive mode, e.g., to prevent write operations on any other ILXAs at that offset in the snapshot data structure 116 or group of snapshot data structures 116.

When destaging, the write cache destager thread simply takes the snapshot lock in exclusive mode.

This embodiment provides consistency between two or more IO threads by the address lock which may be cheaper than a snapshot lock because it has narrower scope and ties up a smaller number of logical addresses from operation by the system. Likewise, the non-exclusive snapshot lock in the IO thread is not limiting to other IO threads performing read operations. However, consistency between the destager threads and IO threads is effectively provided by the snapshot lock which is taken in exclusive mode by the destager threads.

The operation of the information processing system 100 in illustrative embodiments will now be further described with reference to the flow diagrams of FIGS. 6-9. The processes shown in FIGS. 6-9 are suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1-5.

Figure 6:
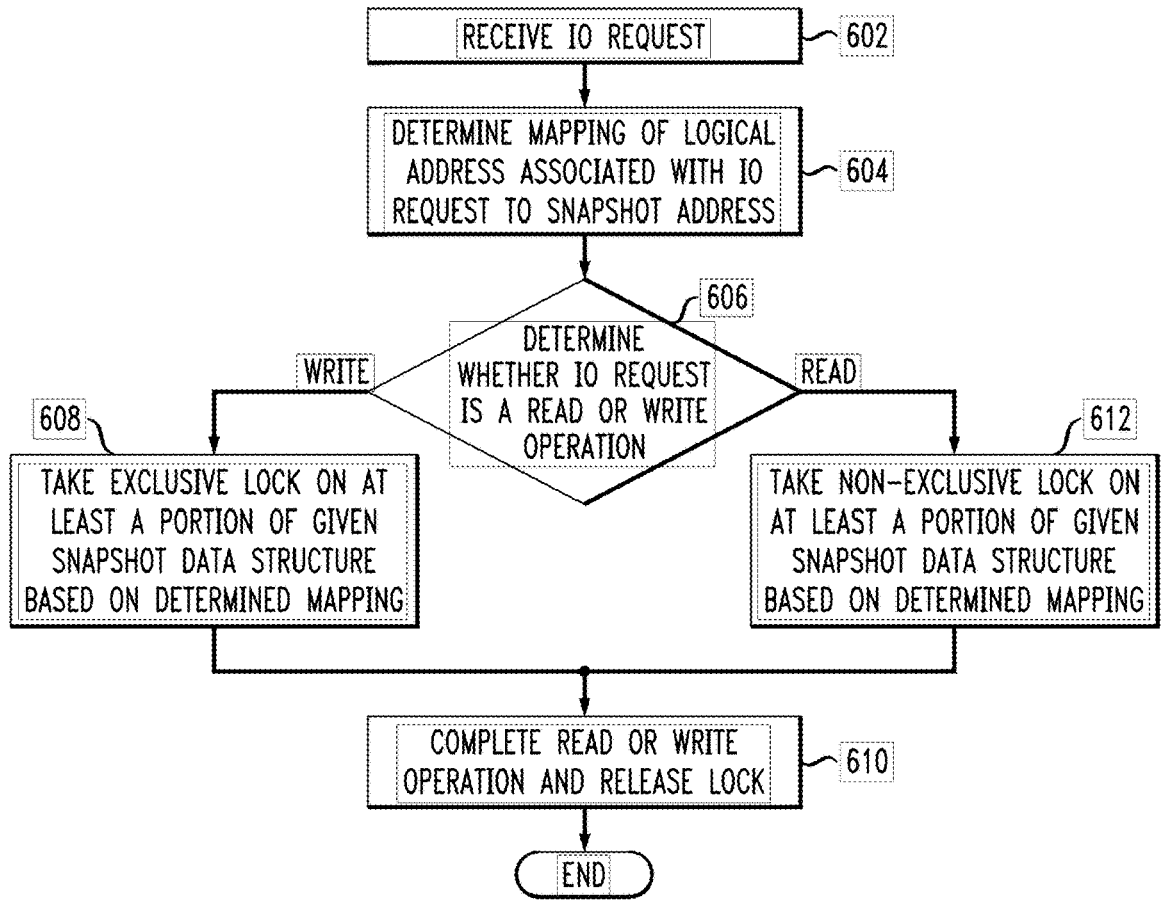
FIG. 6 is a flow diagram of an IO process in an illustrative embodiment.

With reference now to FIG. 6, a process that occurs during processing of an IO request is described according to an illustrative embodiment.

At 602, an IO request is received by storage controller 108, for example, from computer system 101 or other host devices. The IO request may include an identification of an LXA. In some embodiments, the storage controller 108 may generate one or more IO threads to service the IO request.

At 604, the IO thread determines a mapping of the logical address, e.g., LXA, to an SLXA associated with a given snapshot data structure 116 or group of snapshot data structures 116, for example, as described above.

At 606, the IO thread determines whether the IO request is for a read or write operation.

At 608, if the IO thread determines that the IO request is for a write operation, the IO thread takes an exclusive lock on at least a portion of the given snapshot data structure based on the determined mapping, for example, by adding the SLXA as a key to the pool hash table of locks.

At 610, the IO thread completes the read or write operation and releases the lock, e.g., by removing the SLXA from the pool hash table of locks. The process then ends.

Referring back to 606, if the IO thread determines that the IO request is for a read operation, the process moves to 612. At 612, the IO thread takes a non-exclusive lock on at least a portion of the given snapshot data structure based on the determined mapping, for example, by using the SLXA as a key for the hash-based pool of locks. The process then proceeds to 610 and continues as above.

Figure 7:
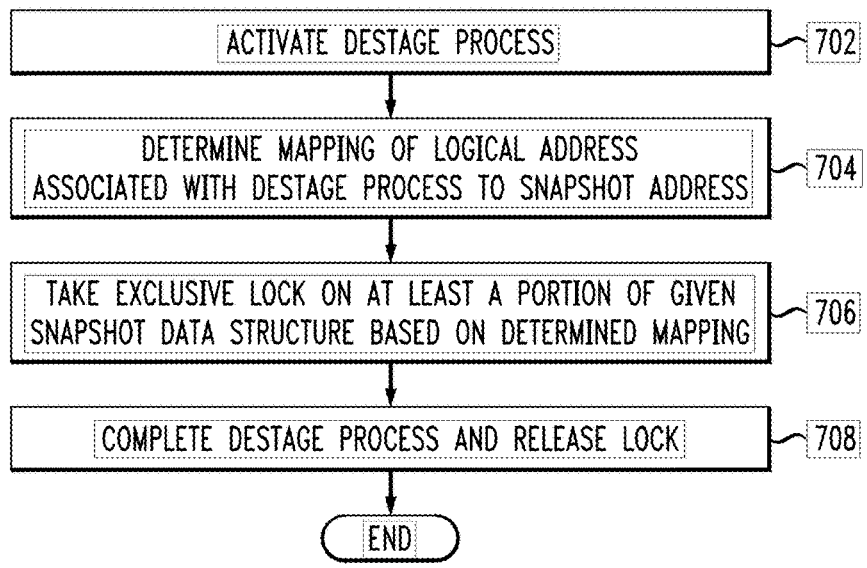
FIG. 7 is a flow diagram of a destage process in an illustrative embodiment.

With reference now to FIG. 7, a process that occurs during a destaging process of the write cache is described according to an illustrative embodiment.

At 702, a destage process is activated, e.g., by a destager thread of storage controller 108.

At 704, the destager thread determines a mapping of the logical address, e.g., ILXA, to an SLXA associated with a given snapshot data structure 116 or group of snapshot data structures 116, for example, as described above.

At 706, the destager thread takes an exclusive lock on at least a portion of the given snapshot data structure based on the determined mapping, for example, adding the SLXA as a key to the pool hash table of locks.

At 708, the destager thread completes the destage process and releases the lock, e.g., by removing the SLXA from the pool hash table of locks. The process then ends.

Figure 8:
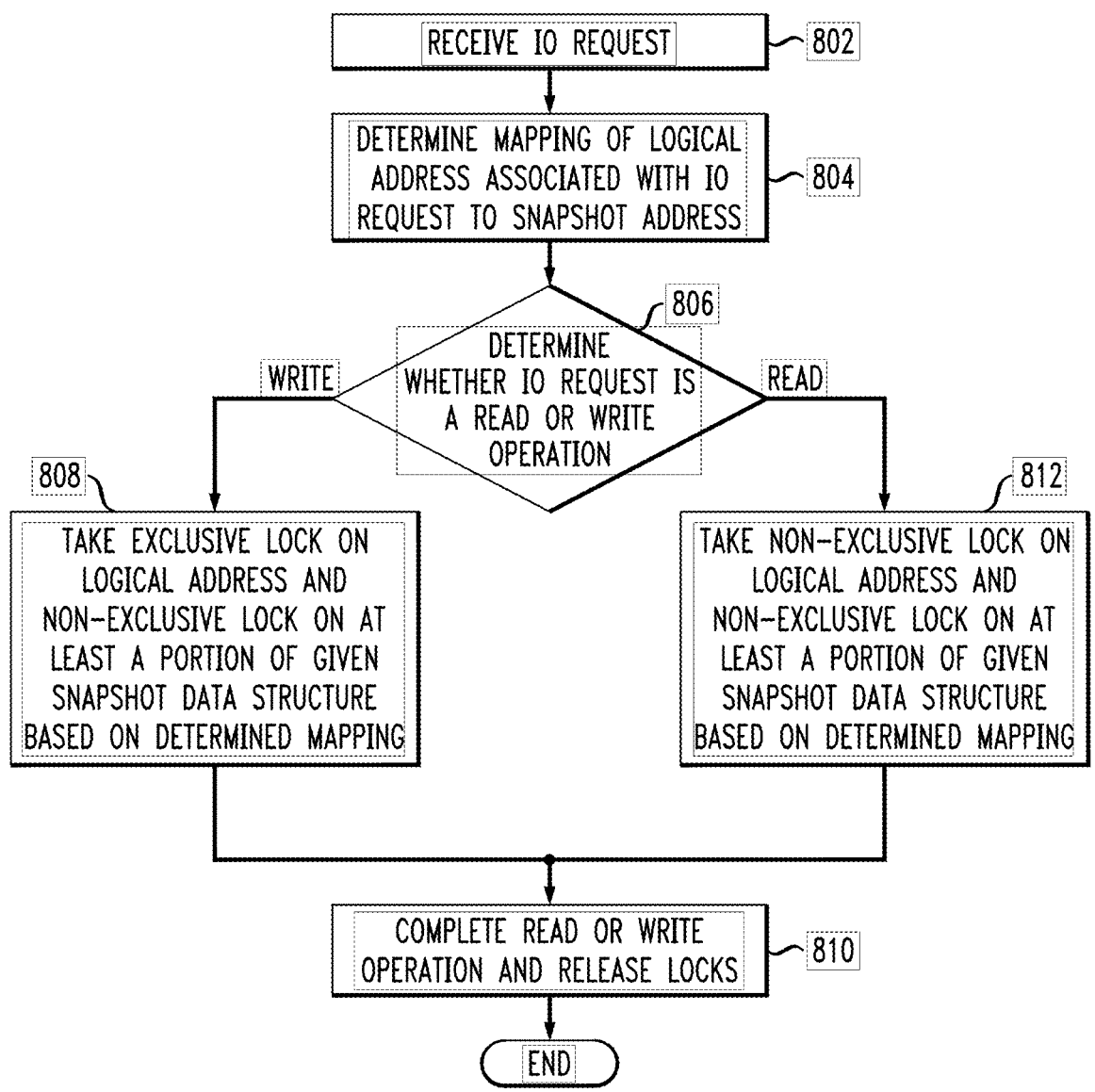
FIG. 8 is a flow diagram of an IO process in another illustrative embodiment.

With reference now to FIG. 8, a process that occurs during processing of an IO request is described according to another illustrative embodiment.

At 802, an IO request is received by storage controller 108, for example, from computer system 101 or other host devices. The IO request may include an identification of an LXA. In some embodiments, the storage controller 108 may generate one or more IO threads to service the IO request.

At 804, the IO thread determines a mapping of the logical address, e.g., LXA, to an SLXA associated with a given snapshot data structure 116 or group of snapshot data structures 116, for example, as described above.

At 806, the IO thread determines whether the IO request is for a read or write operation.

At 808, if the IO thread determines that the IO request is for a write operation, the IO thread takes an exclusive lock on the LXA and a non-exclusive lock on at least a portion of the given snapshot data structure based on the determined mapping. For example, the LXA and the SLXA may be added as keys to the pool hash table of locks.

At 810, the IO thread completes the read or write operation and releases the locks, e.g., by removing the LXA and SLXA from the pool hash table of locks. The process then ends.

Referring back to 806, if the IO thread determines that the IO request is for a read operation, the process moves to 812. At 812, the IO thread takes a non-exclusive lock on the LXA and a non-exclusive lock on at least a portion of the given snapshot data structure based on the determined mapping, for example, by adding the LXA and SLXA as keys to the pool hash table of locks. The process then proceeds to 810 and continues as above.

The above-described functionality of the storage controller 108 is carried out under the control of the locking module 118 of the storage controller 108, operating in conjunction with corresponding control 108C and routing 108R modules, to access the data modules 108D. The modules 108C, 108D, 108R and 108M of the distributed storage controller 108 therefore collectively implement an illustrative process for locking snapshot data structures of content addressable storage system 105.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for locking snapshot data structures in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments, at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

The content addressable storage system 105 may comprise a scale-out all-flash storage array such as an XtremIO™ storage array. A given such storage array can be configured to provide storage redundancy using well-known RAID techniques such as RAID 5 or RAID 6, although other storage redundancy configurations can be used.

The storage devices of such a storage system illustratively implement a plurality of LUNs configured to store files, blocks, objects or other arrangements of data.

A given storage system can be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, components of a distributed storage controller can each be implemented in the form of one or more LXCs running on one or more VMs. Other arrangements of one or more processing devices of a processing platform can be used to implement a distributed storage controller and/or its components. Other portions of the information processing system 100 can similarly be implemented using one or more processing devices of at least one processing platform.

It is to be appreciated that these and other features of illustrative embodiments are presented by way of example only and should not be construed as limiting in any way.

Accordingly, different numbers, types and arrangements of system components such as computer system 101, compute nodes 102, network 104, content addressable storage system 105, storage devices 106, storage controller 108, cache 109, and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with the above described functionality can be offered to cloud infrastructure customers or other users as a PaaS offering.

It is also to be appreciated that the processes and other features and as described above can be adapted for use with other types of information systems, including by way of example an information processing system in which the host devices and the storage system are both implemented on the same processing platform.

The particular processing operations and other system functionality described in conjunction with the figures are presented by way of illustrative example only and should not be construed as limiting the scope of the disclosure in any way. Alternative embodiments can use other types of processing operations for implementing the above described processes and functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for the above described functionality for respective different storage systems or portions thereof within a given information processing system.

Functionality such as that described in conjunction with the figures above can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the processes described above can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate techniques for implementing the processes and functionality as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement the above described processes and functionality.

The techniques implemented in the embodiments described above can be varied in other embodiments. For example, different types of process operations can be used in other embodiments.

In addition, the above-described functionality associated with C-module, D-module, R-module components of an XtremIO™ storage array can be incorporated into other processing modules or components of a centralized or distributed storage controller in other types of storage systems.

Illustrative embodiments of content addressable storage systems or other types of storage systems with functionality for locking snapshot data structures as disclosed herein can provide a number of significant advantages relative to conventional arrangements.

For example, some embodiments can advantageously inhibit competition between IO accesses and destaging processes on logical addresses that have been remapped during an LVM operation. For example, by locking the snapshot data structure for a given SLXA, the LXAs and ILXAs that map to that SLXA are effectively locked, thereby preventing competing accesses by IO threads and destager threads to that SLXA or any logical addresses mapped to that SLXA.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
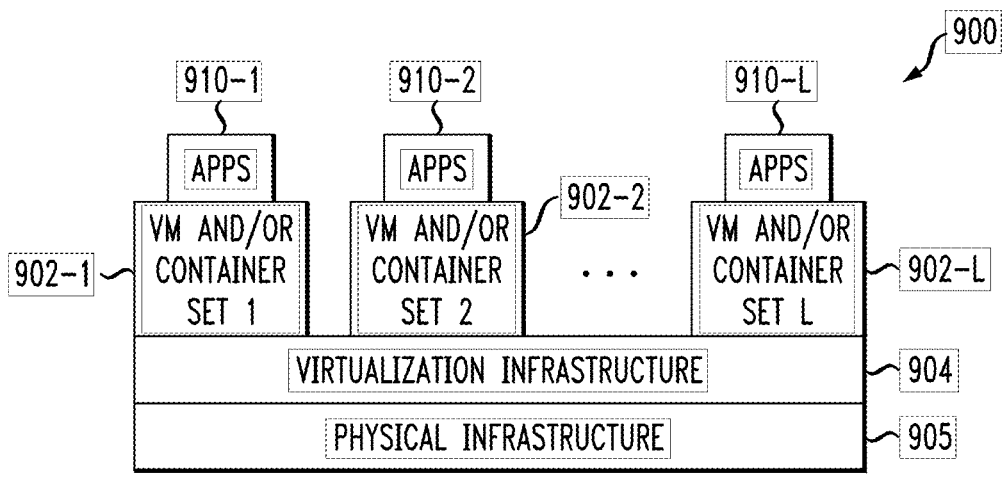
FIGS. 9 and 10 show examples of processing platforms that may be utilized to implement at least a portion of an information processing system in illustrative embodiments.
Figure 10:
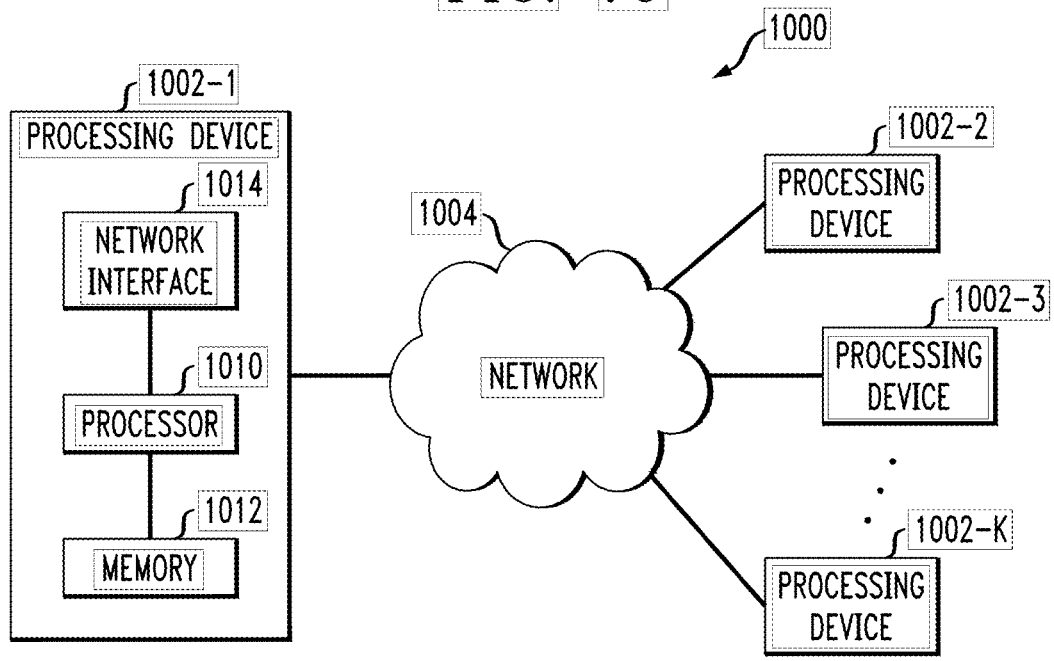

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide functionality of the type described above for one or more processes running on a given one of the VMs. For example, each of the VMs can implement functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide functionality of the type described above for one or more processes running on different ones of the containers. For example, a container host device supporting multiple containers of one or more container sets can implement one or more instances of the functionality of the type described above.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that, in other embodiments, different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, decrement protection processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and an associated storage controller, the plurality of storage devices being configured to store a plurality of logical units (LUNs) and a plurality of snapshot data structures associated with the plurality of LUNs, a given snapshot data structure of the plurality of snapshot data structures corresponding to a given LUN of the plurality of LUNs and having a corresponding snapshot address, the given snapshot data structure comprising a plurality of nodes generated in conjunction with one or more point-in-time snapshots taken based at least in part on the given LUN, each node in the given snapshot data structure corresponding to the given LUN;

wherein the storage controller is configured to:
determine a mapping of a logical address associated with a pending read or write operation associated with the given LUN to the snapshot address corresponding to the given snapshot data structure;
lock at least one of the nodes of the given snapshot data structure in conjunction with an execution of the read or write operation based at least in part on the determined mapping of the logical address to the snapshot address; and
release the lock on the at least one of the nodes of the given snapshot data structure based at least in part on a completion of the read or write operation,
wherein the storage controller is implemented using at least one processing device comprising a processor coupled to a memory.

2. The apparatus of claim 1, wherein the snapshot address comprises a snapshot data structure identifier corresponding to the given snapshot data structure and an offset, the offset associated with each node of the given snapshot data structure.

3. The apparatus of claim 2, wherein the lock is performed on each node of the given snapshot data structure at the offset.

4. The apparatus of claim 1,
wherein the pending read or write operation is a write operation, and
wherein the lock is an exclusive lock.

5. The apparatus of claim 4, wherein the write operation is a destaging operation of a write cache of the storage system.

6. The apparatus of claim 1,
wherein the pending read or write operation is a read operation, and
wherein the lock is a non-exclusive lock.

7. The apparatus of claim 1, wherein the storage controller is further configured to:
lock the logical address during the read or write operation; and
release the lock on the logical address based at least in part on the completion of the read or write operation.

8. The apparatus of claim 7, wherein the lock on the at least a portion of the given snapshot data structure is non-exclusive.

9. A method comprising:
determining a mapping of a logical address associated with a pending read or write operation associated with a given logical unit (LUN) of a storage system to a snapshot address corresponding to a given snapshot data structure of the storage system, the given snapshot data structure corresponding to the given LUN and having a corresponding snapshot address, the given snapshot data structure comprising a plurality of nodes generated in conjunction with one or more point-in-time snapshots taken based at least in part on the given LUN, each node in the given snapshot data structure corresponding to the given LUN;
locking at least one of the nodes of the given snapshot data structure in conjunction with an execution of the read or write operation based at least in part on the determined mapping of the logical address to the snapshot address; and
releasing the lock on the at least one of the nodes of the given snapshot data structure based at least in part on a completion of the read or write operation,
wherein the method is implemented by at least one processing device comprising a processor coupled to a memory.

10. The method of claim 9, wherein the snapshot address comprises a snapshot data structure identifier corresponding to the given snapshot data structure and an offset, the offset associated with each node of the given snapshot data structure.

11. The method of claim 10, wherein the lock is performed on each node of the given snapshot data structure at the offset.

12. The method of claim 9,
wherein the pending read or write operation is a write operation, and
wherein the lock is an exclusive lock.

13. The method of claim 12, wherein the write operation is a destaging operation of a write cache of the storage system.

14. The method of claim 9,
wherein the pending read or write operation is a read operation, and
wherein the lock is a non-exclusive lock.

15. The method of claim 9, wherein the method further comprises:
locking the logical address during the read or write operation; and
releasing the lock on the logical address based at least in part on the completion of the read or write operation.

16. The method of claim 15, wherein the lock on the at least a portion of the given snapshot data structure is non-exclusive.

17. A computer program product comprising a non-transitory processor-readable storage medium having stored therein program code of one or more software programs, wherein the program code when executed by at least one processing device causes said at least one processing device to:
determine a mapping of a logical address associated with a pending read or write operation associated with a given logical unit (LUN) of a storage system to a snapshot address corresponding to a given snapshot data structure of the storage system, the given snapshot data structure corresponding to the given LUN and having a corresponding snapshot address, the given snapshot data structure comprising a plurality of nodes generated in conjunction with one or more point-in-time snapshots taken based at least in part on the given LUN, each node in the given snapshot data structure corresponding to the given LUN;
lock at least one of the nodes of the given snapshot data structure in conjunction with an execution of the read or write operation based at least in part on the determined mapping of the logical address to the snapshot address; and
release the lock on the at least one of the nodes of the given snapshot data structure based at least in part on a completion of the read or write operation.

18. The computer program product of claim 17,
wherein the snapshot address comprises a snapshot data structure identifier corresponding to the given snapshot data structure and an offset, the offset associated with each node of the given snapshot data structure; and wherein the lock is performed on each node of the given snapshot data structure at the offset.

19. The computer program product of claim 17, the program code when executed by at least one processing device further causes said at least one processing device to:

lock the logical address during the read or write operation; and release the lock on the logical address based at least in part on the completion of the read or write operation.

20. The computer program product of claim 17, wherein if the pending read or write operation is a write operation, the lock on the snapshot address is an exclusive lock; and wherein if the pending read or write operation is a read operation, the lock on the snapshot address is a non-exclusive lock.

* * * * *